United States Patent [19]

Eastlack

[11] 4,082,742

[45] Apr. 4, 1978

[54] PROCESS FOR PREPARING AN AQUEOUS DISAZO DYE CONCENTRATE

[75] Inventor: George Franklin Eastlack, Pennsville, N.J.

[73] Assignee: E. I. Du Pont de Nemours and Company, Wilmington, Del.

[21] Appl. No.: 389,196

[22] Filed: Aug. 17, 1973

[51] Int. Cl.$^2$ .............................................. C09B 31/08
[52] U.S. Cl. ................................ 260/187; 260/558 D
[58] Field of Search ............... 260/174, 177, 184, 187, 260/188, 208

[56] References Cited

U.S. PATENT DOCUMENTS

| 3,459,730 | 8/1969 | Schnabel et al. | 260/184 |
| 3,562,249 | 2/1971 | Schnabel et al. | 260/184 |

FOREIGN PATENT DOCUMENTS

| 45/11029 | 4/1970 | Japan | 260/184 |

*Primary Examiner*—Charles F. Warren
*Attorney, Agent, or Firm*—James A. Costello

[57] ABSTRACT

Disclosed herein is a process for preparing an aqueous concentrate of a disazo dye comprising reacting an aminonaphthalene compound with benzoyl chloride in the presence of certain tertiary amines to form a benzamide which is coupled to the diazonium salt of p-(p-aminophenylazo)benzene sodium sulfonate, said diazonium salt having been isolated, prior to the coupling reaction, from the reaction mass in which it was produced.

4 Claims, No Drawings

PROCESS FOR PREPARING AN AQUEOUS DISAZO DYE CONCENTRATE

BACKGROUND OF THE INVENTION

1. Field of the Invention

This invention concerns a process for preparing an aqueous dye concentrate wherein the dye comprises a benzoylated naphthylamine segment coupled to the diazonium salt of p-(p-aminophenylazo)benzene sodium sulfonate.

2. Description of the Prior Art

It is known to form the dye

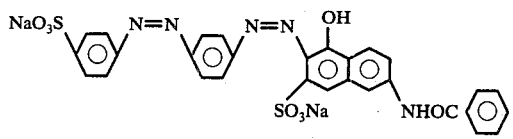

by diazotizing p-(p-aminophenylazo)benzenesulfonic acid, and coupling to N-benzoyl J acid in the presence of a strong alkali. When the dye is dissolved in water the solution changes shade over a period of days. The change in color results from the slow alkaline hydrolysis of the dye, the benzoyl group being removed thereby. When a dye solution is prepared from the reaction mass resulting from the coupling reaction noted above, the problem of change of shade is accentuated, since a greater degree of alkalinity is necessary to overcome the salting out effect of the additional impurities present.

The difficulties of this situation are overcome by the process of the present invention which employs a mildly basic tertiary amine to neutralize HCl released during benzoylation and also as acid acceptor during the coupling reaction. The effectiveness of these tertiary amines in the benzoylation is not taught or suggested by the prior art. While the invention is illustrated with and has found most use with the benzamide derived from J acid, 6-amino-1-naphthol-3-sulfonic acid, it can be applied to other naphthalene amino compounds of comparable reactivity to produce dye concentrates having substantially constant strength of shade.

SUMMARY OF THE INVENTION

This invention concerns a process for making an aqueous disazo dye concentrate, comprising (i) reacting an aminonaphthalene compound with benzoyl chloride at about 0° to 50° C. in an aqueous medium in the presence of an amount of tertiary amine sufficient to maintain pH at between about 4 and 7, the tertiary amine having the formula

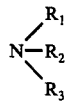

wherein $R_1$ is a hydroxyalkyl radical of 2 to 4 carbons and $R_2$ and $R_3$ are independently alkyl radicals of 1 to 4 carbons or hydroxyalkyl of 2 to 4 carbons, thereby forming the benzamide derivative of the aminonaphthalene compound, (ii) diazotizing p-(p-aminophenylazo)benzene sodium sulfonate in aqueous media at about 0° to 35° C., and isolating the product diazonium salt; and (iii) coupling the product of (i) to the product of (ii) at a temperature between about 15° C. to 30° C. in the presence of a viscosity-reducing agent and sufficient of the tertiary amine to maintain the pH of the reaction mass at between about 5 and 7.

The preferred tertiary amine is triethanolamine. Examples of other useful amines are triisopropanolamine, diethylethanolamine, dimethylethanolamine, ethyldiethanolamine and the like.

Also included within the scope of this invention is the process for making the intermediate benzamide derivative of the aminonaphthalene compound as described in step (i) above.

In the term "aminonaphthalene compound" as employed herein it is meant to include aminonaphthalene compounds and aminonaphthalenesulfonic acid compounds. The isolation of the diazonium salt of step (ii) is preferably accomplished by filtration. The filter cake can then be washed with water to remove impurities. The term "isolation" includes isolation and, optionally, washing. The coupling reaction of step (iii) employs an agent for reducing viscosity. The particular agent that is preferred is a $C_2$ to $C_6$ glycol or glycol ether.

The preferred dye concentrates are the solution products of step (iii) that contain at least about 10% dye by weight. Preferably the dye concentrate solutions contain about 10% to 20% dye by total weight of the solution. Should the dye solution of step (iii) be of a strength other than that desired, the solution can be standardized by well-known means to contain the desired percentage of dye, say, 10% to 20%, or whatever. Since the application of the process will usually lead to a solution more concentrated in dye than 20%, it is most likely that standardization will involve a dilution of the dye solution.

DETAILS OF THE INVENTION

Among the aminonaphthalene compounds that can be benzoylated and coupled according to the process described herein, in addition to 6-amino-1-naphthol-3-sulfonic acid, are 6-amino-1-naphthol, 8-amino-1-naphthol-5-sulfonic acid, and 8-amino-1-naphthol-3,6-disulfonic acid. It is clear that other aminonaphthalene compounds can be processed in the same manner. Many well-known dyes employ the benzoyl derivatives of the above aminonaphthalene compounds in their synthesis.

The benzoylation reaction of step (i) can be carried out in an aqueous solution containing 65% to 85% ethylene glycol, glycerin or similar solvent. The aminonaphtholsulfonic acid dissolves in the mixture when the tertiary amine is added to a pH of about 6.8. Benzoyl chloride is added while pH is held at about 4 to 7 by simultaneous addition of the amine while the temperature is preferably maintained at about 20° to 30° C. The benzoyl chloride can be added continuously or in a number of portions. At the end of the benzoylation the product is a black solution containing crystalline particles. About 25 to 50% molar excess of benzoyl chloride is used.

The diazonium salt to be coupled to the above product is prepared in another reactor. The starting material, p-(-p-aminophenylazo)benzene sodium sulfonate, is a well-known intermediate which is isolated and handled in dry powder form. The diazotization can be carried out in about 6 parts by weight of water to one part of the starting material. The smooth aqueous slurry can be acidified with about 3.5 moles of hydrochloric acid per mole of p-(p-aminophenylazo)benzene sodium sulfonate. With temperature at about 25° C. sodium nitrite is added as an aqueous solution, about 10% molar excess being normally used. Temperature can be allowed to rise freely to about 35° C., but should not be allowed to go much higher. After the diazotization any excess of nitrous acid is destroyed by adding a small amount of sulfamic acid.

The insoluble diazonium salt is isolated by filtration and can be washed with a limited amount of water, about twice the weight of the starting material. CAUTION: this diazonium salt must not be allowed to dry. It can be handled safely as long as it is wet, but precaution should be taken to use it within about 8 hours. Diazonium salts as a group are known to decompose violently in air when dry, although not every member of the class is equally reactive.

The isolated diazonium salt press cake can be prepared for reaction with the coupler in step (iii) by mixing it with an ethylene glycol-water solution to make a smooth, uniform slurry. It is added gradually to the coupler solution simultaneously with a tertiary amine as defined over a 1 to 2 hour period, maintaining reaction temperature at about 20° to 30° C. and pH at about 5 to 7. After all of the reactants have been added, the charge is stirred for an additional hour or more. A crystalline salt (the amine hydrochloride) is formed, and can be removed by filtration. The dye solution product is adjusted to the desired strength by adding 2/1 ethylene glycol/water solution. The pH should be adjusted to about 7 ± 0.5 with the tertiary amine if necessary.

The dye solutions produced in this process can be stored and shipped as solutions for use in dyeing paper, cotton, leather or synthetic fibers. The solutions can be dried, as in a spray dryer, to provide powder dyes which confer similar shades to substrates. The following Example is offered as an illustration of the novel process.

EXAMPLE (i) In a vessel 20.0 parts of ethylene glycol were mixed with 6.7 parts of water, and 7.0 parts of J acid were added and the mixture was heated to about 45° to 50° C. and agitated thoroughly. To the slurry were added 5.0 parts of triethanolamine, forming a clear black solution having a pH of 6.8.

Temperature was adjusted to 25° C. and provision made for cooling the reaction during benzoylation. A total of 6.0 parts of benzoyl chloride and 6.4 parts of triethanolamine were added simultaneously at the same rate over a period of 1 to 2 hours. The pH was maintained at 4.5–6.5 over the entire period.

(ii) In a second vessel (with agitation) 10.1 parts of 30% hydrochloric acid were added to 50 parts of water. To the acid solution were added 8.0 parts of p-(p-aminophenylazo)benzenesulfonic acid sodium salt, and the slurry was thoroughly mixed. With temperature at 25° C. there were added 0.1 part of anti-foam surfactant and 6.2 parts of 31.5% aqueous sodium nitrite solution gradually over about one-half hour. The temperature rose slightly, but it was not necessary to cool the reaction mixture. After about one-half hour the slight excess of nitrous acid was destroyed by adding a little sulfamic acid. The solid diazonium salt product was separated by filtration and washed with 15 parts of water. The wet filter cake was set aside for use in step (iii).

(iii) In this step the diazonium salt prepared in (ii) was coupled to the benzoylated coupler prepared in (i). The wet diazonium salt press cake was first mixed in a paste mixer with 6.7 parts of ethylene glycol and enough water (including that in the press cake) to total 24.7 parts. The well mixed slurry was added to the benzoyl J acid solution simultaneously with triethanolamine over about 2 hours. Temperature was maintained at 22°–28° C., and pH at between 5 and 7. For 31.4 parts of prepared diazo slurry there were used 4.5 parts of triethanolamine. When addition was complete, the reaction mass was stirred for an additional hour, then filtered to remove the insoluble triethanolamine hydrochloride.

The product red dye solution was standardized by comparison to a standard dye solution, a 2:1 mixture of ethylene glycol and water being added to attain the desired strength. The active ingredient content of the standardized solution was about 16.0%. The dye was found to dye paper in red shades very fast to light.

The prepared dye solution showed no clouding or precipitation of solid material when stored for 6 months at about 25° to 30° C. It provided the same strength and shade of dyeings after the storage period as at the beginning.

The embodiments of the invention in which an exclusive property or privilege is claimed are defined as follows:

1. A process for making an aqueous disazo dye concentrate, consisting essentially of
   (i) reacting an aminonaphthalene compound with benzoyl chloride at about 0° to 50° C. in an aqueous medium in the presence of an amount of tertiary amine sufficient to maintain pH at between about 4 and 7, the tertiary amine having the formula

wherein $R_1$ is a hydroxyalkyl radical of 2 to 4 carbons and $R_2$ and $R_3$ are independently alkyl radicals of 1 to 4 carbons or hydroxyalkyl of 2 to 4 carbons, thereby forming the benzamide derivative of the aminonaphthalene compound,
   (ii) diazotising p-(p-aminophenylazo)benzene sodium sulfonate in aqueous media at about 0° to 35° C., and isolating the product diazonium salt; and
   (iii) coupling the product of (i) to the product of (ii) at a temperature between about 15° C. to 30° C. in the presence of a viscosity-reducing agent and sufficient of the tertiary amine to maintain the pH of the reaction mass at between about 5 and 7.

2. A process according to claim 1 including the step of washing the diazonium salt of step (ii) before coupling to the benzamide derivative of step (i).

3. A process according to claim 1 wherein the tertiary amine is triethanolamine.

4. A process according to claim 2 wherein the tertiary amine is triethanolamine.

* * * * *